Oct. 21, 1941.  D. L. RIPLEY  2,260,233
ELECTRIC HEATER
Filed Feb. 23, 1940  2 Sheets-Sheet 1
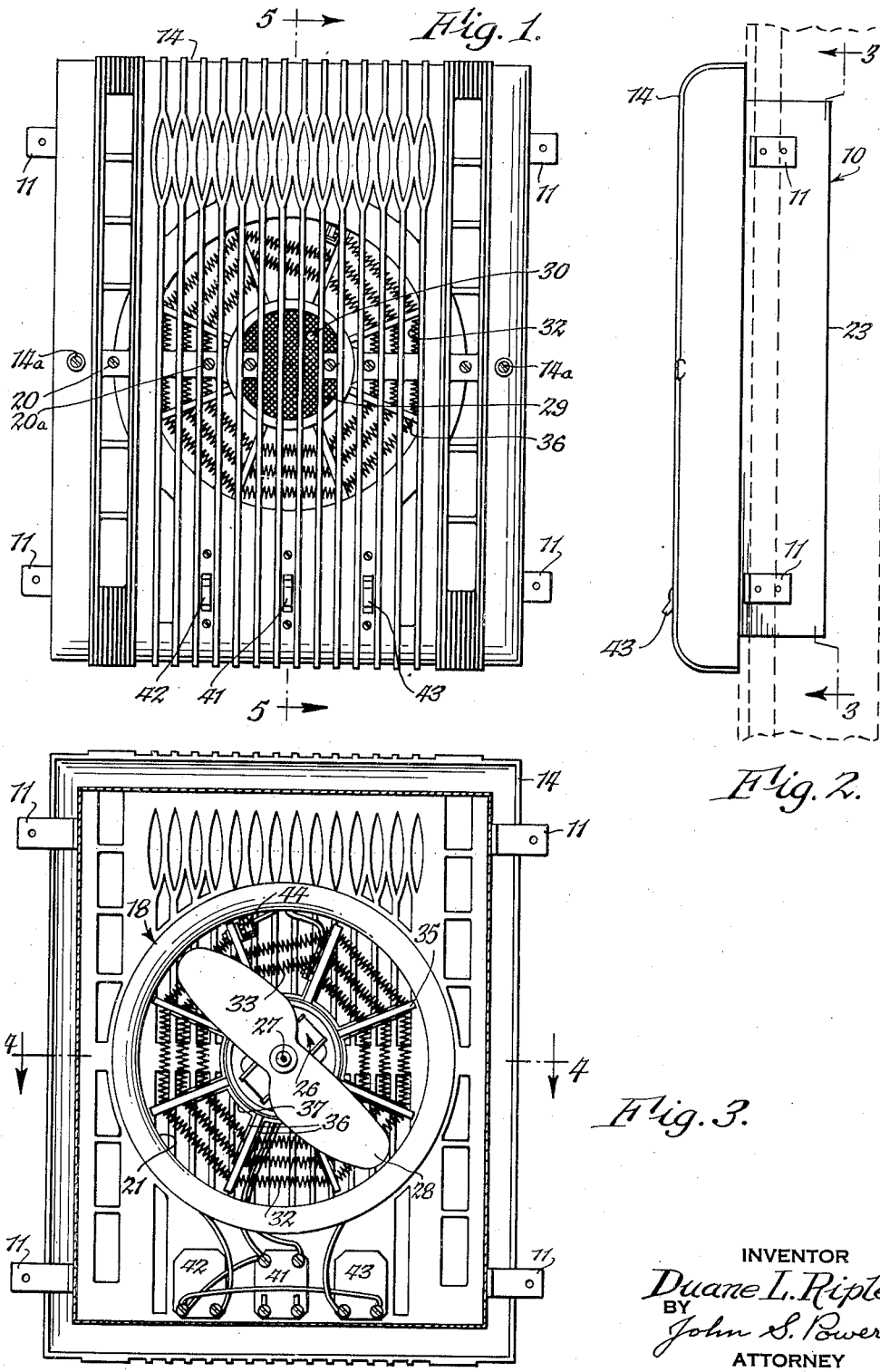
INVENTOR
Duane L. Ripley
BY John S. Powers
ATTORNEY Oct. 21, 1941.    D. L. RIPLEY    2,260,233
ELECTRIC HEATER
Filed Feb. 23, 1940    2 Sheets-Sheet 2

INVENTOR
Duane L. Ripley
BY
John S. Powers
ATTORNEY

Patented Oct. 21, 1941

2,260,233

UNITED STATES PATENT OFFICE 2,260,233

ELECTRIC HEATER

Duane L. Ripley, Buffalo, N. Y., assignor to Markel Electric Products, Inc., Buffalo, N. Y., a corporation of New York Application February 23, 1940, Serial No. 320,335

3 Claims. (Cl. 219—39)

This invention relates to electric heaters of the kind wherein a motor driven fan is employed to effect a forced circulation of air in heat exchange relation with respect to the heating elements and, although not necessarily limited to permanent installations, the heater is characterized by features which render it especially suitable as a built-in wall fixture.

One object of the invention is to provide a heater of the character generally described which is designed so as to eliminate any hazard of fire incidental to its use.

A further object is to provide a heater having a large capacity, this object contemplating a construction which will permit relatively free flow of the air through the heating elements without interfering with the uniform heating of such air to the desired temperature.

A still further object is a heater wherein provision is made for preventing overheating of the fan motor.

A still further object is to provide a heater which is compact in design and pleasing and attractive in appearance.

A still further object is to provide for facility in assembling and installing the heater and in disassembling the parts for purposes of inspection, repair and replacement.

The invention is illustrated in the accompanying drawings in which:

Figure 1 is a front view of a heater embodying the features of the invention.

Figure 2 is a side view thereof.

Figure 3 is a vertical section taken along line 3—3 of Figure 2.

Figure 4:
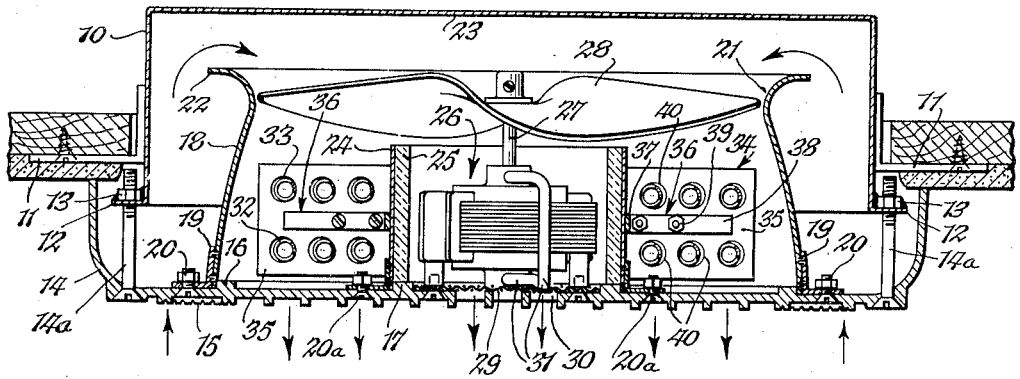
Figure 4 is an enlarged horizontal section taken along line 4—4 of Figure 3.

The heater, as illustrated, includes a receptacle 10 which is adapted to be arranged in a recess formed in a wall of a room and secured therein by brackets 11, the said receptacle having side flanges 12 (Figure 4) which carry nuts 13 and to which a cover 14 is removably secured by bolts 14a. The front panel 15 of the cover is formed to provide an ornamental grill, the sides of the cover fitting against the wall in which the heater is mounted and spacing the grill in offset relation with respect to the wall.

Annular concentric ribs 16 and 17 are formed or provided upon the back of the panel 15. A cylindrical shell 18 fits over the rib 16 and is secured to the panel by angle-pieces 19 (Figure 4) and fastenings 20. The shell 18 tapers gradually from the panel to a reduced neck portion 21 and terminates in an outwardly flaring lip 22 which is supported in spaced relation with respect to the back wall 23 of the receptacle 10. A cylindrical shell 24 fits over the rib 17, the said shell being located within and in concentric relation with respect to the shell 18, being suitably secured to the panel 15 and having its inner wall sheathed with a lining 25 of asbestos or other suitable heat insulating material. An electric motor 26 arranged within the shell 24 and mounted upon the back of the panel 15 includes an armature shaft 27 to which a fan 28 is fixed. The said fan is supported within the neck portion of the shell 18 between the inner end of the latter and the corresponding end of the shell 24, the span of the blades of the fan preferably being slightly less than the inside diameter of the neck portion of the shell 18, as best shown in Figure 4. The shell 24 serves as a housing for the motor, the parts of which are otherwise exposed. It is preferred that a screen 29 be arranged against the back of the grill within the area delimited by the rib 17, the said screen serving as a guard and being formed with an opening 30 to provide access to oil pipes 31 which lead to the bearings of the motor.

Figure 5:
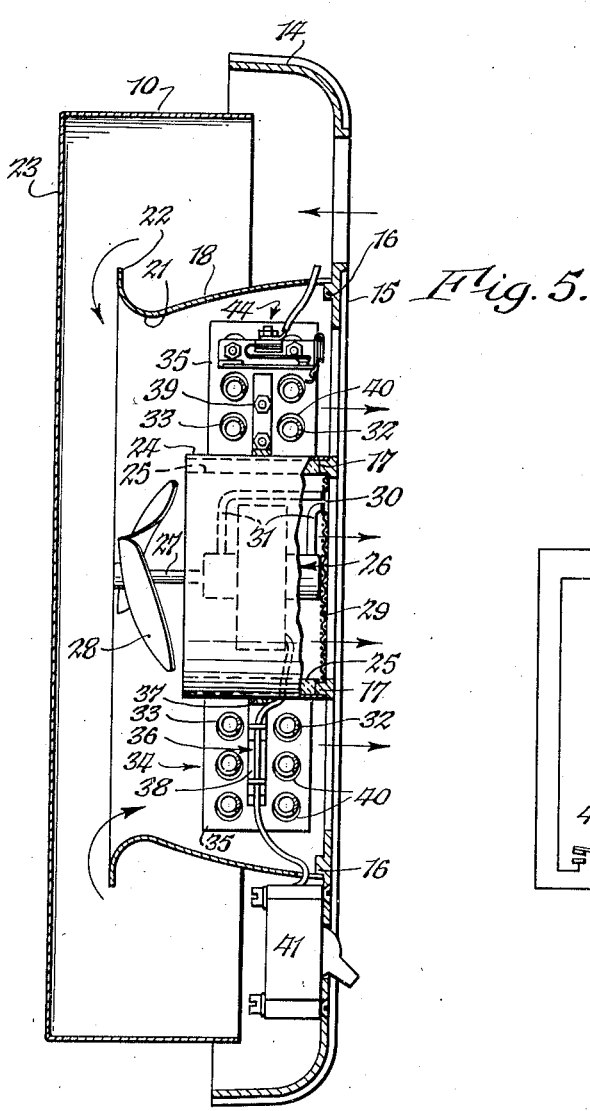
Figure 5 is an enlarged vertical section taken along line 5—5 of Figure 1.
Figure 6:
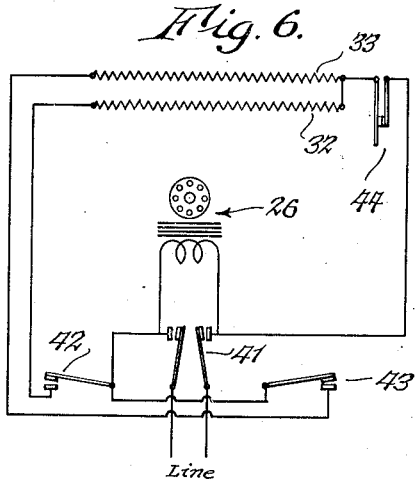
Figure 6 is a diagram of the wiring of the heater.

The fan 28 is operative to draw air into the receptacle 10 through the openings located around the marginal portions of the grill and to expel it through the centrally located openings, the air which is expelled being first separated by the inner and outer shells into two concentric streams. The stream which passes through the inner shell serves to cool the motor. The outer stream which passes between the two shells, however, is heated. To this end heating elements 32 and 33 are arranged, one behind the other, around the inner shell and between the latter and the outer shell, the said elements preferably being of the so-called "black" type and being in the form of coils which are wound in flat spirals. The heating elements are supported upon a spider 34. The latter includes radially extending members 35 of any suitable heat resisting, dielectric material which are mounted upon the inner shell by strap-pieces 36, the said strap-pieces having body portions 37 (Figure 4) which are welded or otherwise suitably secured to the inner shell and arms 38 which are secured to the members 35 by fastenings 39. The dielectric members are formed at opposite sides of the arms 38 with series of openings 40 in which the convolutions of the spirals of the heating elements are supported, it being noted (referring to Figures 4 and 5) that the convolutions of the spiral of the heating element 33 are similar to and are located directly behind the convolutions of the spiral of the element 32.

The operation of the heater is controlled by switches 41, 42 and 43 which are mounted upon the back of the panel 15 below the shell 18, the control elements of the switches projecting through suitable openings formed in the panel. The switch 41 which is of the double-pole type connects the motor 26 across the line; the switches 42 and 41 connect the element 32 across the line; and the switches 43 and 41 connect the element 33 across the line. The arrangement described has the advantage that, although either, or both, of the heating elements may be connected to power, this cannot be accomplished until the motor circuit has been first closed, thereby insuring the circulation of air in heat exchange relation with respect to the elements whenever they are energized. Overheating of the device is thus prevented. As a precautionary measure, however, it is preferred that the circuit for the heating elements include a thermostatic switch 44 which is automatically operative to break the circuit for the elements in the event of failure of the motor. The said switch is preferably mounted upon one of the dielectric members 35 directly above the heating elements so as to be located in the zone in which the generated heat will be the most intense. Any hazard of fire through careless operation of the heater or failure of the motor is thus eliminated.

From the foregoing it will be apparent that in the operation of the heater only the incoming air comes into contact with the receptacle 10 and that this air flows over all sides and the back of the receptacle and around the entire outer wall of the shell 18. The receptacle, therefore, is continually cooled and remains at a temperature well below any value which might be considered hazardous despite the high temperature to which the air expelled from the heater may be heated and despite its close association with the wall structure. The current of air directed through the inner shell 24 serves to cool the motor and maintain it at a safe operating temperature, this inner current mingling with and being heated by the outer surrounding current of hot air which flows from between the inner and outer shells.

The heater has a large capacity owing to the relative freedom with which the air flows through it, this being facilitated by the use of heating elements of the shape and arrangement described, the arrangement of the heating elements in tandem with the convolutions of the spiral of the element 33 located directly behind the convolutions of the spiral of the element 32 providing uninterrupted passages of substantial area through which the air may pass. The convolutions of the coils which form the spirals, however, are spaced relatively close together. Hence any air which enters the coils or passes between their convolutions is heated to a high temperature. This highly heated air is entrained by the air flowing between the convolutions of the spirals and serves to raise substantially the temperature of the entire stream. The arrangement of the heating elements in the manner described has the further advantage that uniform heating of the air is insured even though only one of the elements is utilized, it being noted in this connection that the convolutions of the spiral of each element are spaced uniformly in and across the space between the inner and outer shells.

It will be apparent that although the heater is designed primarily as a built-in fixture and that when so employed the receptacle will be permanently installed in the wall recess provided for this purpose, access can, nevertheless, be readily had to the parts of the heater for purposes of inspection, repair or replacement by removing the cover 13 which provides a mounting for the motor, heating elements and shells 18 and 24.

I claim as my invention:

1. A heater of the character described including a casing, a grill which is adapted to be supported in front of said casing, inner and outer annular coaxially arranged shells which are mounted upon the back of said grill and which extend into said casing, said outer shell being of greater length than said inner shell and tapering in the direction of said casing to a reduced neck portion which terminates in an outwardly flaring lip, said grill being formed with air inlet and outlet openings, the former being located outside the area delimited by said outer shell and the latter being located within said area, a heating element supported between said shells, a motor mounted in said inner shell and a fan which is driven by said motor, said fan being located outside said inner shell and within the reduced neck portion of said outer shell and being operative to draw air into the casing through the inlet openings in said grill, a part of said air being forced between said inner and outer shells so that it is heated by said element and a part being forced through said inner shell to cool said motor.

2. A heater of the character described including a casing, a grill which is adapted to be supported in front of said casing and which is formed with air inlet and outlet openings, inner and outer annular co-axially arranged shells which are mounted upon the back of said grill and which extend into said casing, a heat insulating sheath associated with said inner shell, said outer shell being of greater length than said inner shell and cooperating with said casing to provide an air inlet passage, a heating element supported between said shells, said air inlet openings being located outside the area delimited by said outer shell and said air outlet opening being located within said area, a motor mounted in said inner shell, said motor utilizing said inner shell and insulating sheath as a housing and having its parts otherwise exposed and a fan driven by said motor which is located outside of said inner shell and within said outer shell and which is operative to draw air into the casing and expel a part of it between said shells so that it is heated by said element and a part of it through said inner shell to cool said motor, said casing being cooled by the air passing through said inlet passage.

3. A heater of the character described including a casing, a grill which is adapted to be supported in front of said casing and which is formed with air inlet and outlet openings, inner and outer co-axially arranged shells which are mounted upon the back of said grill and which extend into said casing, a heat insulating sheath associated with said inner shell, said outer shell being of greater length than said inner shell, tapering in the direction of said casing to a reduced neck portion which terminates in an outwardly flaring lip and cooperating with said casing to provide an air inlet passage, a heating element supported between said shells, said air inlet openings being located outside the area delimited by the outer shell and said air outlet openings being located within said area, a motor mounted in said inner shell, said motor utilizing said inner shell and insulating sheath as a housing and having its parts otherwise exposed and a fan driven by said motor which is located outside said inner shell and within the reduced neck portion of said outer shell and which is operative to draw air into the casing through the inlet openings in said grill and expel a part of it between said shells so that it is heated by said element and to expel a part of it through said inner shell to cool said motor, said casing being cooled by the air passing through said inlet passage.

DUANE L. RIPLEY.